United States Patent
Settelmayer et al.

(10) Patent No.: US 6,918,521 B2
(45) Date of Patent: Jul. 19, 2005

(54) CAR TOP CARRIER WITH QUICK RELEASE CLAMPING DEVICE

(75) Inventors: Joseph J. Settelmayer, Fieldbrook, CA (US); Scott R. Allen, Fieldbrook, CA (US); Timothy C. Smith, McKinleyville, CA (US)

(73) Assignee: Watermark PaddleSports, Inc., Aracata, CA (US)

( * ) Notice: Subject to any disclaimer, the term of this patent is extended or adjusted under 35 U.S.C. 154(b) by 0 days.

(21) Appl. No.: 10/662,123

(22) Filed: Sep. 11, 2003

(65) Prior Publication Data

US 2004/0155081 A1 Aug. 12, 2004

Related U.S. Application Data

(60) Provisional application No. 60/443,437, filed on Jan. 28, 2003.

(51) Int. Cl.⁷ .................................................. B60R 9/00
(52) U.S. Cl. ...................................... 224/319; 224/328
(58) Field of Search .............................. 224/319, 42.4, 224/328, 405, 404; 410/77, 80; 248/691, 97, 229.13, 228.4, 228.6

(56) References Cited

U.S. PATENT DOCUMENTS

| | | | | | |
|---|---|---|---|---|---|
| 1,313,687 | A | * | 8/1919 | Hellweg | 224/42.4 |
| 4,217,999 | A | * | 8/1980 | Forsman | 224/319 |
| 4,249,684 | A | * | 2/1981 | Miller et al. | 224/42.4 |
| 4,274,568 | A | * | 6/1981 | Bott | 224/319 |
| 4,406,387 | A | * | 9/1983 | Rasor | 224/328 |
| 5,419,479 | A | | 5/1995 | Evels et al. | |
| 5,492,258 | A | | 2/1996 | Brunner | |
| 5,582,313 | A | | 12/1996 | Envall | |
| 5,762,244 | A | * | 6/1998 | Wagner et al. | 224/281 |
| 5,845,828 | A | | 12/1998 | Settelmayer | |
| 5,947,356 | A | * | 9/1999 | Delong | 224/404 |
| 6,145,719 | A | * | 11/2000 | Robert | 224/401 |
| 6,273,311 | B1 | | 8/2001 | Pedrini | |
| 6,296,161 | B1 | | 10/2001 | Van der Feen et al. | |
| 2002/0030074 | A1 | | 3/2002 | Bove et al. | |

FOREIGN PATENT DOCUMENTS

| | | |
|---|---|---|
| DE | 28 04 588 | 9/1979 |
| DE | 195 26 477 | 12/1996 |

* cited by examiner

*Primary Examiner*—Tri M. Mai
(74) *Attorney, Agent, or Firm*—Kolisch Hartwell, P.C.

(57) ABSTRACT

The invention provides improvements for an enclosed carrier configured for mounting on top of a car.

28 Claims, 3 Drawing Sheets ately at the location shown in FIG. 3. This way
CAR TOP CARRIER WITH QUICK RELEASE CLAMPING DEVICE

CROSS-REFERENCE TO RELATED APPLICATION

This application is based upon and claims priority under 35 U.S.C. §119 from U.S. Provisional Patent Application Ser. No. 60/443,437, filed Jan. 28, 2003, which is incorporated herein by reference in its entirety for all purposes.

FIELD OF THE INVENTION

The invention relates to assemblies for carrying cargo on a vehicle. In particular, the invention provides improvements for a box or trunk designed for mounting on top of a car.

BACKGROUND OF THE INVENTION

In recent years car top carriers in the form of boxes or trunks have become quite popular. Enclosed carriers are preferable over conventional open racks for a variety of reasons. Enclosed carriers protect cargo from the elements such as wind, rain, and snow. Enclosed carriers are also more secure from theft or vandalism.

However, some car top boxes have problems which make them difficult or cumbersome to use. For example, some boxes use a labor intensive bracket system to secure the box on to the crossbars of a vehicle roof rack. Bracket systems typically require the installer to reach extensively over the top of the car. Such bracket systems are impractical, particularly for a person who is short in stature. The installer may have to practically climb into the open box to secure the brackets. This is especially a problem for a user who frequently wants to install or remove the carrier from the car.

Another problem with some enclosed car top carriers is that they can only be accessed from one side. Depending on where or how the vehicle is parked, or who is trying to access the carrier, it may be inconvenient or awkward to always access the box from the same side.

Another problem with car top trunks or boxes is that they are sometimes difficult to open. Typically, there are several latches on the side of the box that opens. The user may have to operate multiple latches simultaneously where the latches are separated by a long distance. This may require substantial strength, dexterity, and reach. Some boxes have an actuator that coordinates simultaneous release of multiple latches but still may require special handling such as lifting of the cover while manipulating the actuator or handle. Accordingly, there is a need for enclosed car top carriers that are easy to mount on a vehicle and easy to use.

SUMMARY OF THE INVENTION

In one example of the invention, an improved car top carrier uses a mounting assembly that is quick and easy to use. A preferred example uses a cam-operated clamping device to grip crossbars on a vehicle rack. Another aspect of the invention involves use of coordinated hinge/latch devices to permit easy opening of the carrier from either side of a vehicle. Other aspects of the invention are described in detail below.

DESCRIPTIONS OF EXAMPLES OF THE INVENTION

Figure 1:
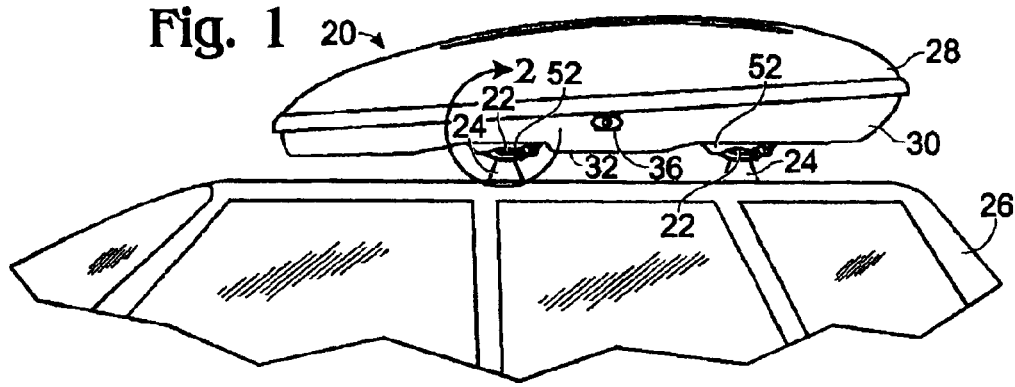
FIG. 1 is a side view of a car top carrier mounted on a vehicle.

The invention provides systems, devices, and methods for easily and rapidly securing a car top container to one or more crossbars. One aspect of the invention utilizes a jaw device mounted underneath the floor of a container. The jaw device is operated between open and closed positions by manipulating a cam lever inside the container. Examples of the invention are shown in the drawings and discussed in detail below.

FIG. 1 shows car top carrier 20 mounted on crossbars 22 of rooftop rack 24 of vehicle 26. The long axis of car top carrier 20 is perpendicular to crossbars 22. Car top carrier 20 includes top 28 connected via hinges (not shown) to bottom 30 which has floor 32. Four clamps 34 (only two are shown) secure car top carrier 20 to crossbars 22. Latch 36 keeps car top carrier 20 closed, and can be operated to allow opening when desired. Latch 36 may be provided with a key or combination operated lock mechanism.

Figure 2:
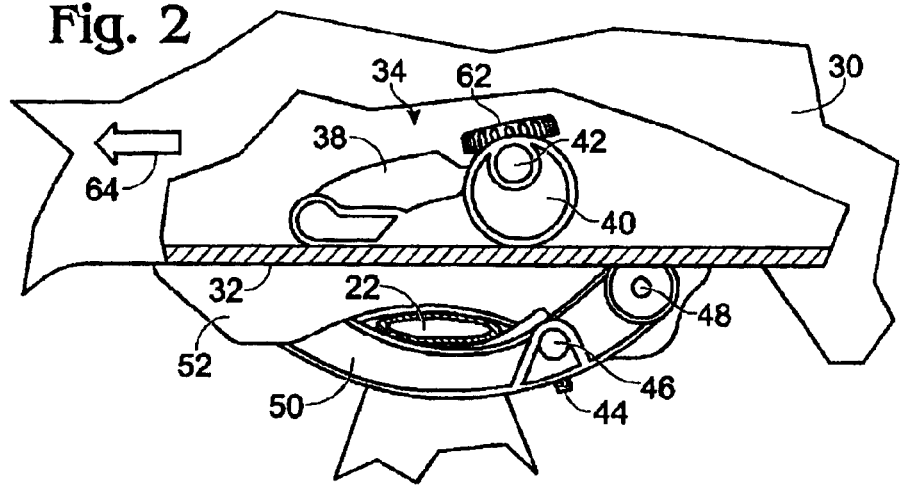
FIG. 2 is a partial cut away view from FIG. 1 showing a clamp used to secure the car top carrier.

FIG. 2 is a side view of one of clamps 34, with a portion of bottom 30 of carrier 20 cut away. In closed position, cam lever 38 seats against floor 32 of bottom 30. Cam lever 38 acts through cam portion 40, shaft member 42, bolt 44, barrel nut 46, and axle 48 to apply a force holding crossbar 22 tightly clamped between movable jaw portion 50 and stationary jaw portion 52.

Figure 3:
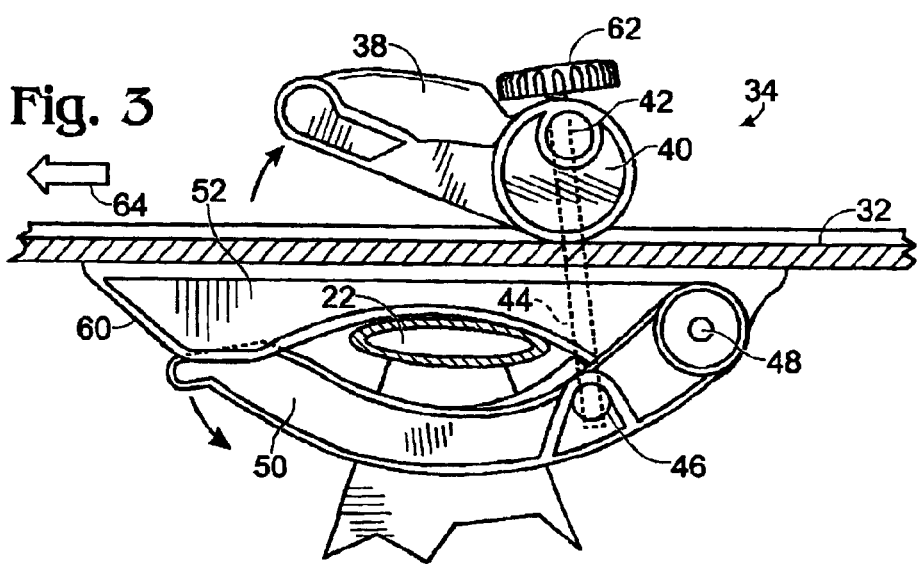
FIGS. 3 and 4 show partial side views of the clamp of FIG. 2 as the cam lever moves toward the release position.
Figure 4:
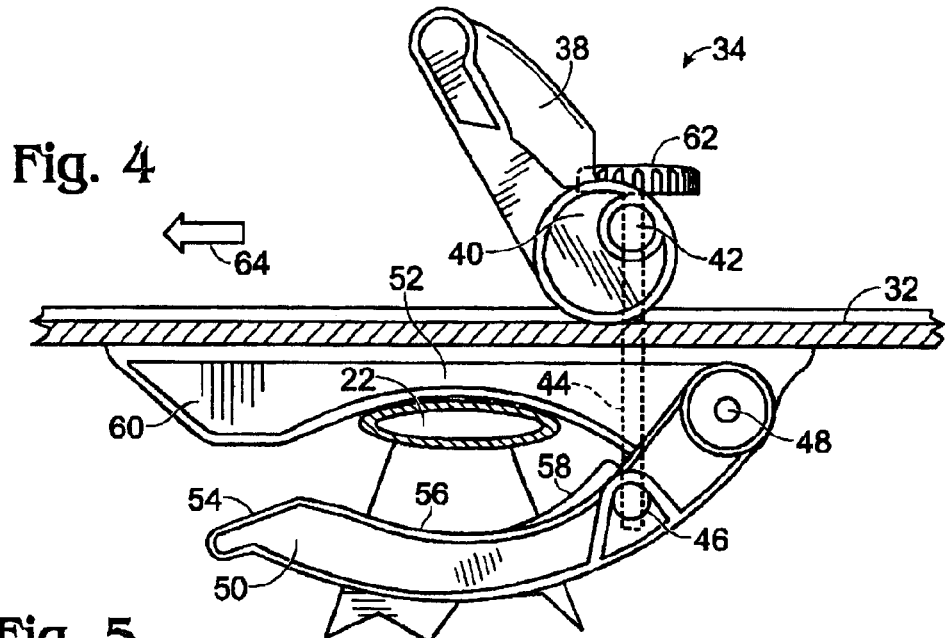

FIGS. 3 and 4 show details of clamp 34 during opening. Cam lever 38 pivots around shaft member 42 as shown. The shape of cam portion 40 and the position of shaft member 42 causes opening and closing of movable jaw portion 50 relative to stationary jaw portion 52 when cam lever 38 is rotated between different positions as shown in FIGS. 2 to 4. Cam portion 40 is shaped so that as lever 38 rotates around shaft member 42 the distance between shaft member 42 and floor 32 is altered, thus causing corresponding pivotal movement of jaw portion 50 toward or away from fixed stationary jaw potion 52 mounted on floor 32. An over-center mechanism is used so that a maximum height of shaft member 42 is reached at an intermediate point, for example, approximately at the location shown in FIG. 3. This way lever 38 tends to stay locked in the closed position shown in FIG. 2, and tends to spring to the unlocked position when lever 38 is moved over-center in the opposite direction, as shown in FIG. 4. Movable jaw portion 50 pivots around axle structure 48. Movable jaw portion 50 is elongate, with an initial portion 54 angled so as to guide crossbar 22 into position between movable jaw potion 50 and stationary jaw portion 52 movable jaw portion 50 has a concave inner surface 56 which contacts crossbar 22 when the jaw is closed, and which is configured for gripping. Concave inner surface 56 has a cushion pad 58 near axle 48. Stationary jaw portion 52 has side tabs 60 to prevent side-to-side or flexing motion of movable jaw portion 50 when clamp 34 is in the closed position.

Clamp 34 is mounted on floor 32 of carrier bottom 30 by bolt 44, with barrel nut 46 serving us an anchor pivot for bolt 44. In addition, a first oversize knob 62 turns bolt 44 to move barrel nut 46 closer to or farther away from shaft member 42, thereby providing a gross adjustment mechanism for the tightness of the clamping action. Movable jaw portion 50 clamps around crossbar 22. In FIGS. 2, 3, and 4, arrow 64 indicates the direction of forward travel of vehicle 26. Movable jaw portion 50 preferably is oriented to open in the forward direction to make carrier 20 less likely to be dislodged from vehicle 26 in a high-impact forward collision.

Figure 5:
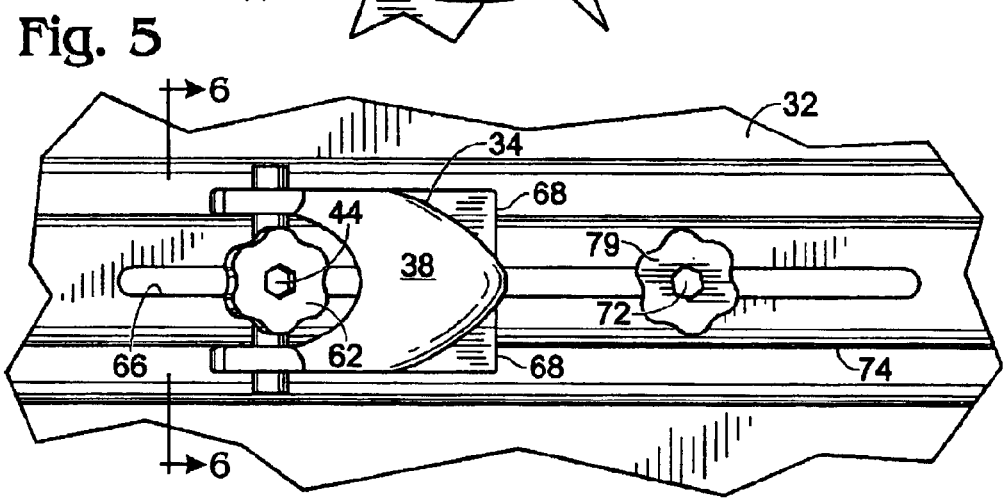
FIG. 5 is a top view of the clamp of FIG. 2.

FIG. 5 shows a top view of clamp 34. Bolt 44 passes from the inside of car top carrier 20 to the outside through floor 32 of carrier bottom 30 via slot 66 which is aligned with the long axis of car top carrier 20. Slot 66 allows adjustment of the location of clamp 34 along the long axis of car top carrier 20. Finger tabs 68 facilitate prying cam lever 38 away from floor 32 when opening of clamp 34 is desired. Cam lever 38 is shaped to provide clearance for first oversize knob 62 when cam lever 38 is moved from the open position to the closed position or vice versa. A second oversize knob 70 provides for tightening or loosening of fastener 72 passing through slot 66 to stationary jaw component 52 to prevent or allow motion of clamp 34 in slot 66. Floor 32 of bottom 30 is shaped in the form of a ridge or rail 74 to complement the shape of clamp 34 and aid in seating cam lever 38 against floor 32 when clamp 34 is in the closed position, thereby providing repeatable alignment.

Figure 6:
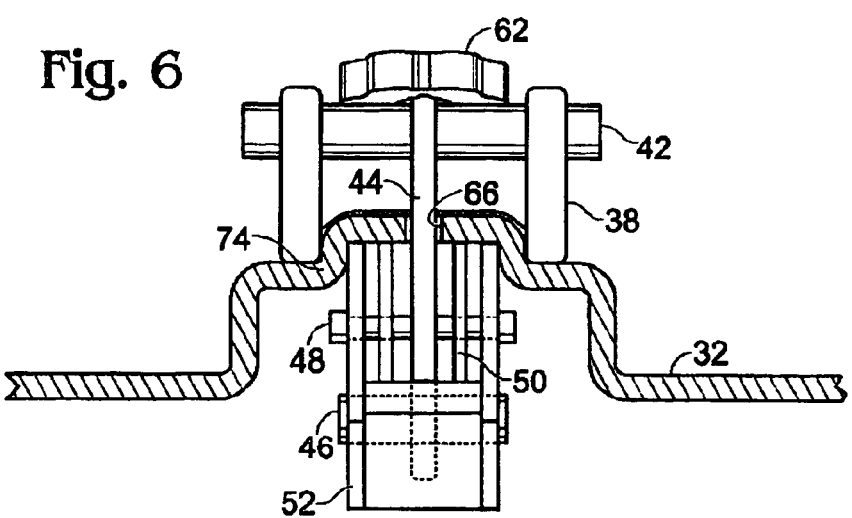
FIG. 6 is an end-on view of the clamp of FIG. 2.

FIG. 6 is an end-on view of clamp 34, as shown in FIG. 5. Shaft member 42 may include curvature away from barrel nut 46 so as to provide spring action during operation of clamp 34.

Figure 7:
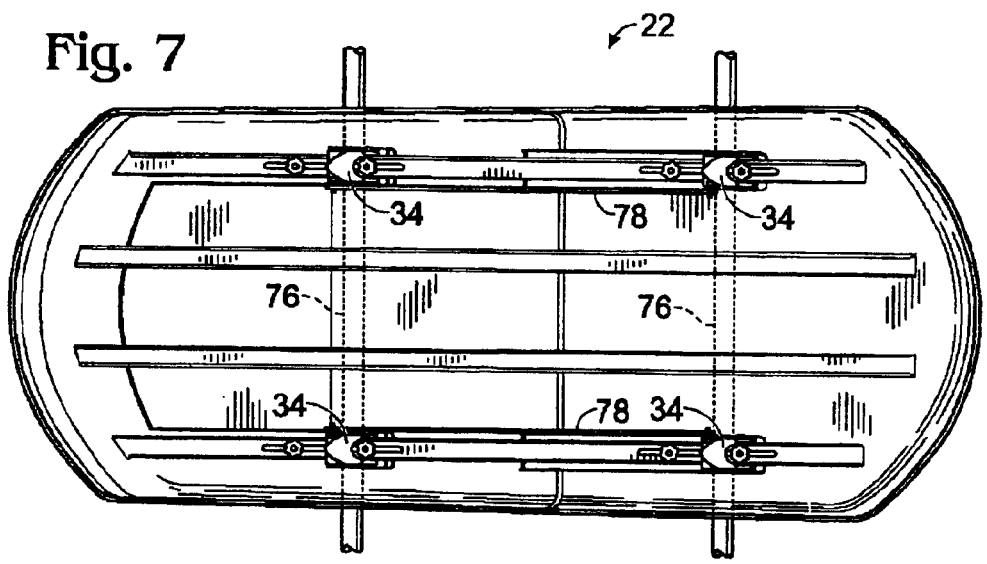
FIG. 7 is a top view of the car top carrier with four clamps showing ganging of the clamps.

FIG. 7 shows a top view of the interior of car top carrier 20 including four clamps 34. In this embodiment, all four clamps 34 are ganged by connectors 76 and 78. Ganging clamps allows multiple clamps to be operated with a single movement. Ganged clamp configurations may also make it easier to operate clamps located distally from the installer's vantage point.

Figure 8:
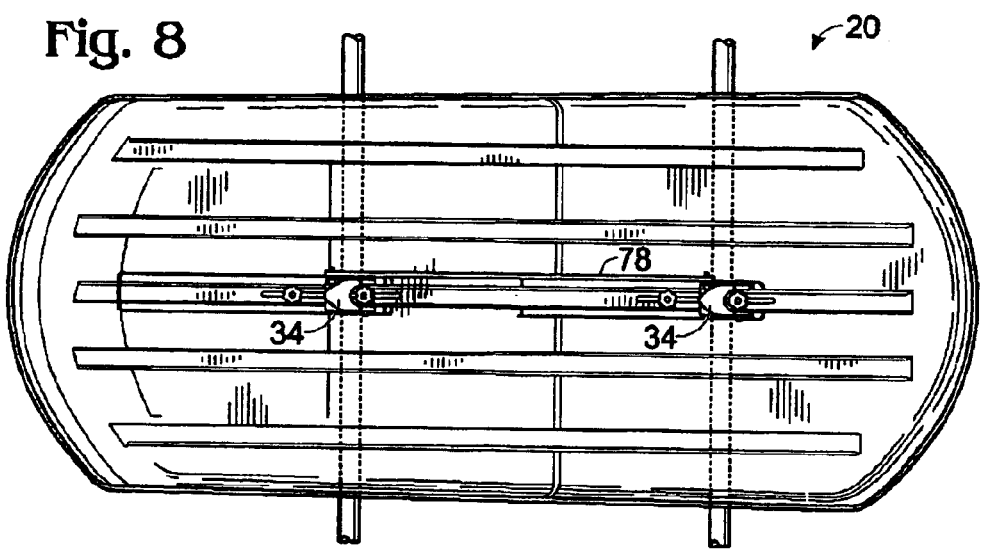
FIG. 8 is a top view of the car top carrier with two clamps showing ganging of the clamps.

FIG. 8 shows a top view of car top carrier 20 with two clamps 34. In this embodiment, two clamps 34, located on front and rear crossbars, are ganged by connectors 78 so that clamps 34 open and close together.

Any number of clamps may be used to fasten a container on a set of crossbars on top of a vehicle. For example, one, two or more clamps may be used to secure a container on a front crossbar. Similarly, one, two or more clamps may be used to secure a container to a rear crossbar. For some purposes a single clamp may be sufficient, for example, on the front crossbar with the container merely resting on the back crossbar. In other instances, a single clamp may be used on each crossbar, or multiple clamps may be used on one or both crossbars.

Any combination of clamps may be ganged. For example, it may be advantageous to have a clamp which is closest to the hinge side of a box (distal clamp) ganged to a clamp on the opening side of the box (proximal clamp) so that operation of the proximal clamp automatically operates a corresponding distal clamp.

It may also be advantageous to have an extended handle or actuator connected to the distal clamp so that the distal clamp can be operated with minimal reaching from the open side of its container.

A jaw member as described above, may have different shapes. For example, the jaw member may be generically shaped to fit around differently shaped or dimensioned crossbars. Alternatively, the jaw member may be custom-shaped to fit around a specific crossbar configuration. For example, the jaw member may have a partially rectangular inner surface for fitting around a rectangular or square cross bar.

Clamping devices should be designed to minimize manufacturing costs and complexity. For example, a rail with a slot, as described above, may be molded into the floor of a box. A stationary jaw portion, movable jaw portion, and cam lever may be separately molded pieces.

Different kinds of actuators may be used to operate the jaw assembly. For example, an actuator may be a differently-shaped cam, or may be a screw mechanism using a threaded member. A cam lever may operate in different directions other than parallel to the long axis of a container as described above.

A clamp mechanism, as described above, may be implemented to connect other types of apparatus to crossbars on top of a vehicle.

The clamp mechanisms shown and described herein may be implemented on boxes with any type of hinge and/or latch mechanism. For example, the clamping devices may be used on a box with dual function hinges that can operate as a hinge or a latch, for example, as described in U.S. Pat. No. 5,823,411 and U.S. Provisional Patent Application No. 60/443,437, each of which is hereby incorporated by reference in its entirety.

While the present invention has been particularly shown and described with reference to the foregoing preferred embodiments, those skilled in the art will understand that many variations may be made therein without departing from the spirit and scope of the invention as variously described and defined above. The description of the invention should be understood to include all novel and nonobvious combinations of elements described herein.

We claim:

1. A cargo carrying case for rooftop mounting on a motor vehicle having a pair of crossbars, comprising
   a box having a floor,
   at least one clamp device mounted under the floor of the box, the clamp device having an open position configured for receiving a crossbar, and a closed position configured for firmly grasping the crossbar, and
   at least one lever structure mounted inside the box, the lever structure being moveable between a first position and a second position, the lever structure being connected to the clamp device so that movement of the lever structure from the first position to the second position causes the clamp device to move from the open position to the closed position, thereby securing the box on the crossbar, wherein the clamp device includes a jaw structure having a stationary upper portion and a pivoting bottom portion that moves toward the upper portion when the lever structure is moved from the first position to the second position.

2. The cargo carrying case of claim 1, wherein the lever structure has a cam portion.

3. The cargo carrying case of claim 1, wherein the lever structure has an over-center action between the open position and closed position.

4. The cargo carrying case of claim 1, wherein the clamp device and the lever structure are mounted opposite from each other on opposing sides of the floor of the box.

5. The cargo carrying case of claim 1, wherein the bottom portion has a concave inner surface configured to at least partially encompass the crossbar.

6. A cargo carrying case for rooftop mounting on a motor vehicle having a crossbar, comprising a box having a floor, and at least one clamp device comprising a jaw device outside the box for clamping the crossbar against the floor of the box, the jaw device being pivotable about a first axis parallel to the crossbar between open and closed positions, so that when the jaw device is in the open position the crossbar can be received or removed from the clamp, and when the jaw device is in the closed position the crossbar is prevented from entering or exiting the clamp, and a cam lever within the box, the cam lever being connected to the jaw device through an opening in the floor so that movement of the cam lever around a second axis inside the box causes movement of the jaw device between open and closed positions.

7. The cargo carrying case of claim 6, wherein the opening in the floor is a slot perpendicular to the crossbar, so that, when the clamp device is in the open position, the clamp device can be moved in a direction perpendicular to the crossbar.

8. The cargo carrying case of claim 7, wherein the clamp device further comprises a stationary jaw device component.

9. The cargo carrying case of claim 8, wherein the clamp device further comprises a fastener passing through the slot to the stationary jaw device component, so that when the fastener is tightened the stationary jaw device component prevents motion of the clamp device in the slot.

10. The cargo carrying case of claim 6, wherein the first and second axes are parallel when the clamp device is in the closed position.

11. The cargo carrying case of claim 6, wherein the carrying case comprises a plurality of clamp devices.

12. The cargo carrying case of claim 11, wherein two or more clamp devices are arranged laterally so as to clamp the same crossbar.

13. The cargo carrying case of claim 12, wherein the two or more clamp devices are ganged for easier and/or simultaneous opening and closing of the clamp devices.

14. The cargo carrying case of claim 6, wherein the first and second axes are non-parallel when the clamp device is in the closed position.

15. The cargo carrying case of claim 14, wherein the first and second axes are perpendicular when the clamp device is in the closed position.

16. The cargo carrying case of claim 15, wherein the carrying case comprises a plurality of clamp devices, and wherein two or more clamp devices are arranged so as to clamp different crossbars.

17. The cargo carrying case of claim 16, wherein the two or more clamp devices are ganged.

18. The cargo carrying case of claim 13 or the cargo carrying case of claim 17, wherein all of the clamp devices are ganged.

19. The cargo carrying case of claim 6, wherein the jaw device is elongate, with an initial portion of the jaw device angled so as to guide the crossbar into the jaw device, and with a concave inner surface that contacts the crossbar and is configured for gripping, wherein the concave inner surface has a cushion pad near the first axis.

20. The cargo carrying case of claim 19, wherein the clamp device further comprises a stationary jaw device component.

21. The cargo carrying case of claim 20, wherein the stationary jaw device component has side tabs to prevent side-to-side or flexing motion of the pivotable jaw device when the clamp device is in the closed position.

22. The cargo carrying case of claim 6, wherein the clamp device is provided with a gross adjustment mechanism.

23. The cargo carrying case of claim 22, wherein the gross adjustment mechanism is a bolt with the threaded end of the bolt being received in an anchor pivot in the jaw device, the anchor pivot being set away from the first axis, and with the head end of the bolt being received in an oversized knob so as to make gross adjustment easier.

24. The cargo carrying case of claim 23, wherein the cam lever is shaped to provide clearance for the oversized knob when the cam lever is moved from the open to the closed position or vice versa.

25. The cargo carrying case of claim 6, wherein the cam lever includes finger tabs at the end of the cam lever farthest from the second axis for ease in moving the cam lever to the open position.

26. The cargo carrying case of claim 6, wherein the floor has a surface characteristic that complements the shape of the cam lever so that moving the cam lever to the closed position seats the cam lever and provides repeatable alignment.

27. The cargo carrying case of claim 26, wherein the floor close to the clamp device is shaped in the form of a ridge so that moving the cam lever to the closed position seats the cam lever against the ridge.

28. The cargo carrying case of claim 6, wherein the first axis includes curvature away from the anchor pivot so as to provide spring action during clamp device operation.

* * * * *